United States Patent
Kiel

(10) Patent No.: US 11,001,354 B1
(45) Date of Patent: May 11, 2021

(54) PERSONAL FLOTATION DEVICE

(71) Applicant: George Kiel, Houston, TX (US)

(72) Inventor: George Kiel, Houston, TX (US)

(*) Notice: Subject to any disclaimer, the term of this patent is extended or adjusted under 35 U.S.C. 154(b) by 0 days.

(21) Appl. No.: 16/383,080

(22) Filed: Apr. 12, 2019

Related U.S. Application Data

(60) Division of application No. 15/869,027, filed on Jan. 11, 2018, now Pat. No. 10,259,547, which is a continuation of application No. 15/423,135, filed on Feb. 2, 2017, now abandoned.

(51) Int. Cl.
| | |
|---|---|
| *B63C 9/20* | (2006.01) |
| *B63C 9/11* | (2006.01) |
| *B63C 9/125* | (2006.01) |
| *A41D 1/00* | (2018.01) |
| *A41D 13/01* | (2006.01) |
| *A41D 13/012* | (2006.01) |
| *H02J 7/35* | (2006.01) |
| *A41D 1/04* | (2006.01) |

(52) U.S. Cl.
CPC ............... *B63C 9/20* (2013.01); *A41D 1/005* (2013.01); *A41D 13/01* (2013.01); *A41D 13/0125* (2013.01); *B63C 9/11* (2013.01); *B63C 9/1255* (2013.01); *A41D 1/04* (2013.01); *B63B 2203/00* (2013.01); *B63B 2213/02* (2013.01); *H02J 7/35* (2013.01)

(58) Field of Classification Search
CPC .......... B63C 9/08; B63C 9/081; B63C 9/125; B63C 9/20; B63C 9/11; B63C 9/1255; A41D 1/005; A41D 13/01; A41D 13/0125
USPC .......... 441/89, 106, 108; 362/103, 104, 108, 362/158, 184, 190, 191
See application file for complete search history.

(56) References Cited

U.S. PATENT DOCUMENTS

| | | | | |
|---|---|---|---|---|
| 4,968,277 | A * | 11/1990 | Parish | B63C 9/18 |
| | | | | 441/93 |
| 5,370,566 | A * | 12/1994 | Mitchell, Jr. | B63C 9/20 |
| | | | | 441/106 |
| 5,603,648 | A * | 2/1997 | Kea | B63C 9/1255 |
| | | | | 441/106 |
| 10,259,547 | B1 * | 4/2019 | Kiel | A41D 13/01 |
| 2006/0291193 | A1 * | 12/2006 | Hill | A41D 13/01 |
| | | | | 362/108 |

* cited by examiner

*Primary Examiner* — Lars A Olson
(74) *Attorney, Agent, or Firm* — Elliott Law PLLC; Douglas H. Elliott; Nathan Q. Huynh

(57) ABSTRACT

One or more specific embodiments herein includes a personal flotation device, comprising a vest capable of floating in water and having front panels; a power source; a light source; at least two support straps; a first electrical cable; and a second electrical cable. Further, the first electrical cable and the second electrical cable are capable of being connected to one another to form a connector assembly through which electrical current is capable of flowing, and the connector assembly includes a housing for preventing water from contacting the electrical current when the connector assembly is formed.

20 Claims, 6 Drawing Sheets

PERSONAL FLOTATION DEVICE

BACKGROUND

1. Field of Inventions

The field of this application and any resulting patent is personal flotation devices.

2. Description of Related Art

Various methods and devices have been proposed and utilized for personal flotation, including the methods and devices disclosed in the references appearing on the face of this patent. However, these methods and devices lack all the steps or features of the methods and devices covered by any patent claims below. As will be apparent to a person of ordinary skill in the art, the methods and devices covered by the claims of the issued patent solve many of the problems that prior art methods and devices have failed to solve. Also, the methods and devices covered by at least some of the claims of this patent have benefits that could be surprising and unexpected to a person of ordinary skill in the art based on the prior art existing at the time of invention.

SUMMARY

One or more specific embodiments disclosed herein includes a personal flotation device, comprising a vest capable of floating in water and having front panels capable of being alternately either in an open position or a closed position; a power source; a light source electrically connected to the power source; at least two support straps that are capable of holding the vest in a closed position; a first electrical cable that has a first front end, a first rear end, and one or more electrically conductive metal wires passing through the first electrical cable from the first front end to the first rear end, wherein each of the one or more electrically conductive wires passing through the first electrical cable includes a first wire end portion; and a second electrical cable that has a second front end, a second rear end, and one or more electrically conductive metal wires passing through the second electrical cable from the second front end to the second rear end, wherein each of the one or more electrically conductive wires passing through the second electrical cable includes a second wire end portion. Further, the first front end and the second front end are capable of being connected to one another to form a connector assembly through which electrical current is capable of flowing from the first wire end portion to the second wire end portion, and the connector assembly includes a housing for preventing water from contacting either the first wire end portion or the second wire end portion when the connector assembly is formed.

One or more specific embodiments disclosed herein includes a personal flotation device, comprising a vest capable of floating in water; a battery coupled to the vest; a light source coupled to the vest; a first flexible conduit coupled to the vest and a first wire disposed inside the first conduit; a second flexible conduit coupled to the vest and a second wire disposed inside the second conduit, wherein the first wire and the second wire are capable of forming an electrical connection such that electrical current is capable of passing between the first wire and the second wire; and a housing that prevents water from contacting either the first wire or the second wire while electrical current is passing between the first wire and the second wire.

One or more specific embodiments disclosed herein includes a personal flotation device, comprising a vest capable of floating in water; a battery; a light source; a first conduit coupled to the vest and a first wire disposed inside the first conduit; a second conduit coupled to the vest and a second wire disposed inside the second conduit; a first plug coupled to the first wire wherein electrical current is capable of flowing between the first plug and the first wire; and a second plug coupled to the second wire wherein electrical current is capable of flowing between the second plug and the second wire wherein the first plug includes a male plug end. Further, the second plug includes a female receptacle end; the female receptacle end and the male plug end are capable of forming an electrical connection through which electrical current is capable of flowing; and the female receptacle end includes a housing that prevents liquid from contacting either the first wire or the second wire while the electrical connection is formed.

DETAILED DESCRIPTION

1. Introduction

Figure 1:
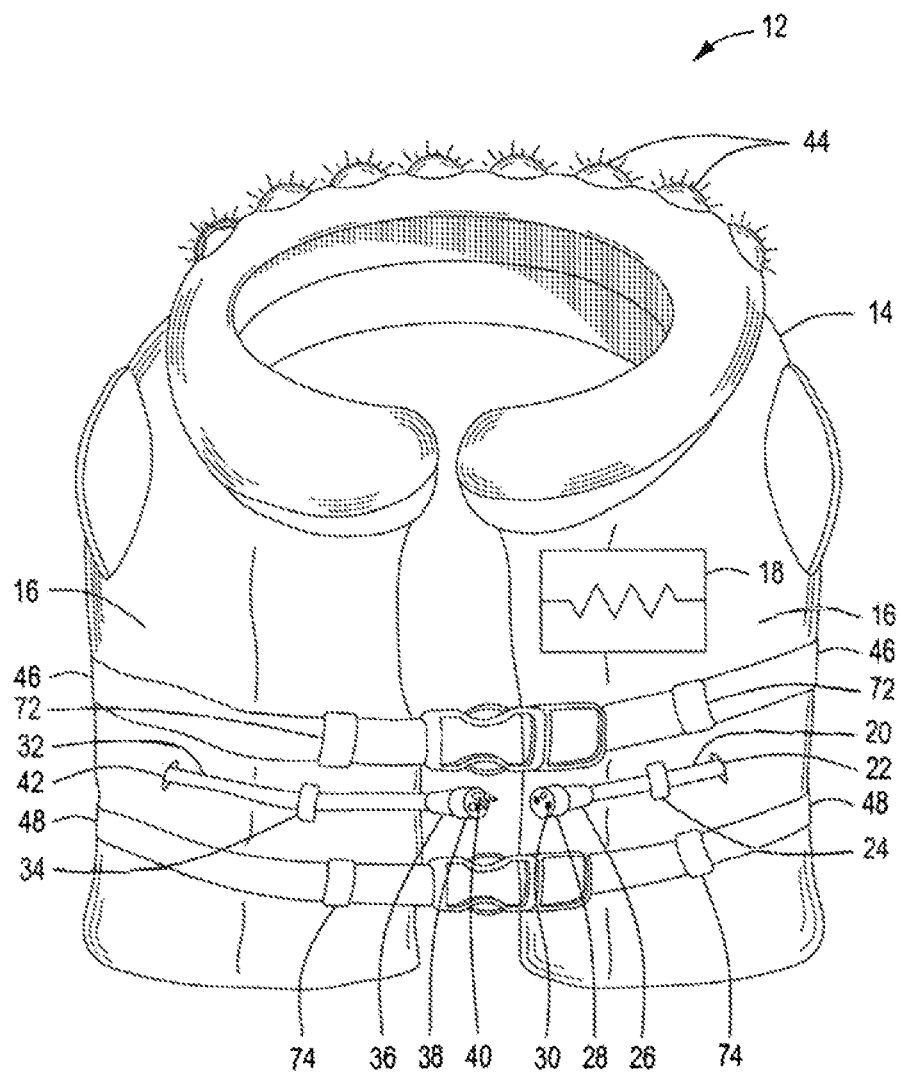
FIG. 1 is a perspective view of an embodiment of a personal flotation device from the front.

A detailed description will now be provided. The purpose of this detailed description, which includes the drawings, is to satisfy the statutory requirements of 35 U.S.C. § 112. For example, the detailed description includes a description of the inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO. To the extent a term used in a claim is not defined below or in representations to the PTO, it should be given the broadest definition persons having skill in the art have given that term as reflected in any printed publication, dictionary, or issued patent.

2. Selected Definitions

Certain claims include one or more of the following terms which, as used herein, are expressly defined below.

The term "vest" as used herein is defined as a garment that extends to the waist, e.g. a sleeveless life preserver. In certain embodiments described herein, a vest may have at least one back "panel" and at least two front "panels," which would allow the vest to be in an open or closed position. The term "panel" as used herein is defined as a separate or distinct part of a surface, e.g. a vertical section of fabric. Further, in certain embodiments described herein, a vest may have an outer vest surface and an inner vest surface with a vest cavity between the outer vest surface and the inner vest surface. In certain embodiments described herein, a vest may include certain "buoyancy core material." The term "buoyancy control material" as used herein is defined as a material that is capable of keeping a vest afloat when in water. The buoyance control material may include, but is not limited to, naturally buoyant materials such as cork, balsa wood, and kapok as well as plastic foams such as polyvinyl chloride and polyethylene. Alternatively, a vest may be automatically or manually inflated. In certain embodiments described herein, a vest may use "support straps" across two front panels in order to maintain the vest in a closed position. The term "support strap" as used herein is defined as a strip or thong of a flexible material for securing or holding together. In certain embodiments described herein, support straps may be flat strips of material, e.g. nylon. Alternatively, a zipper may be used instead of support straps.

The term "power source" as used herein is defined as any structure that is capable of providing electric power. In certain embodiments described herein, a power source may be (or include or be part of a "battery." The term "battery" as used herein is defined as a direct-current (DC voltage source made up of one or more units that convert chemical, thermal, or solar energy into electrical energy. Further, in certain embodiments described herein, the battery may be a "rechargeable battery," such as rechargeable lithium battery. The term "rechargeable battery" as used herein is defined as a type of electrical battery which can be charged, discharged into a load, and recharged many times.

The term "light source" as used herein is defined as any structure that is capable of providing artificial light, preferably electric light, which is a type of artificial light generated by electricity. In the context of a certain personal flotation device described herein, an example of an electric light is a light-emitting diode (LED) bulb. In certain embodiments described herein, the light source may be made up of more than one light bulb. In certain embodiments described herein, the light source may be an LED light strip.

The term "electrical cable" as used herein is defined as two or more wires combined together to form a single assembly protected by sheathing. In certain embodiments described herein, opposing ends of an electrical cable may each be connected to one of two devices, enabling the transfer of electrical signals from one device to the other. In certain embodiments described herein, two or more electrically conductive metal wires may be running side by side and bonded, twisted, or braided together to form a single assembly. Further, an electrical cable may vary in shape, e.g. round or flat. In certain embodiments described herein, one end of an electrical cable may be connected to an inverter or a light source. For example, the wires of an electrical cable may be connected to an inverter or a light source using connectors including, but not limited to, crimp connectors or plugs.

In certain embodiments described herein, one end of an electrical cable has a "female receptacle end." The term "female receptacle end" as used herein is defined as any structure having one or more electrical terminals and one or more apertures leading to the one or more electrical terminals. A "female receptacle end" may be or include, for example, a connector attached to a wire, cable, or piece of hardware, having one or more recessed holes with electrical terminals inside, and constructed in such a way that a plug with exposed conductors can be inserted into it to ensure a reliable physical and electrical connection. For example, in order to attach a female receptacle end to the wires of an electrical cable, the wires may be wrapped around screws in the female receptacle end or the wires may be held in place by clamping devices in the female receptacle end.

In certain embodiments described herein, one end of an electrical cable may have a "male plug end." The term "male plug end" as used herein is defined as any structure having one or more protrusions, e.g., pins that are sized and shaped such that they are capable of insertion into corresponding apertures in the female receptacle end, which protrusions are preferably electrical terminals capable of forming a closed electrical circuit when contacting the female receptacle end. A "mail plug," may be or include, for example, a connector attached to a wire, cable, or piece of hardware, having one or more exposed, unshielded electrical pins, and constructed in such a way that it can be inserted into a receptacle. For example, in order to attach a male receptacle end to the wires of an electrical cable, the wires may be wrapped around screws in the male plug end or the wires may be held in place by clamping devices in the male plug end.

The term "connector assembly" as used herein is any structure, e.g., an electro-mechanical device having at least two sections or parts that are capable of being coupled (joined so as to join electrical terminals and create an electrical circuit. In certain embodiments described herein, a connector assembly may be a male plug end inserted into a female receptacle end.

The term "housing" as used herein is defined as a case or enclosure to cover and protect a structure or a mechanical device. In certain embodiments described herein, a male plug end and a female receptacle end may each include rubber housing to seal an electrical connection between the male plug end and the female receptacle end from contact with liquid, e.g., water.

The term "photovoltaic cell" as used herein is defined as a semiconductor diode that is capable of converting visible light into direct current (DC. Photovoltaic (PV cells are sometimes referred to as solar cells. Photovoltaic cells are the building blocks of photovoltaic modules, also known as solar panels. There are different options for the semiconductor material that may be used. For example, a semiconductor material used may be crystalline silicon, monocrystalline silicon, epitaxial silicon, polycrystalline silicon, ribbon silicon, or mono-like-multi (MLM silicon.

The term "charge controller" as used herein is defined as a regulator that is capable of limiting the rate at which electric current is added to or drawn from electric batteries. It prevents overcharging and may protect against overvoltage. Charge controllers may also be referred to as solar regulators. A charge controller may be used to power DC equipment with PV cells. A charge controller provides a regulated DC output and stores excess energy in a battery as well as monitoring the battery voltage to prevent under/overcharging.

The term "inverter" as used herein is defined as a device that is capable of converting the direct current (DC output of a photovoltaic cell into an alternating current (AC. In certain embodiments described herein, a solar micro-inverter may be used. A micro-inverter is designed to operate with a single photovoltaic cell or module.

The term "emergency beacon" as used herein is defined as a device that is capable of creating a signal, e.g., via sound or light, that can be perceived so as to aid in the detection and location of any person, animal or object in distress. One example of an emergency beacon that may be used is a personal locator beacon (PLB, which is a small radio transmitter, connected to a global government-run emergency network. PLB's provide worldwide coverage. Further, PLB's have a built-in, low-power homing beacon, and some newer model may allow GPS units to be integrated into the distress signal. Another example of an emergency beacon that may be used is a personal AIS beacon (PAB, which uses both GPS and AIS (automatic identification system technology to send structured alert messages containing the PAB's precise location information to any AIS receiver onboard any AIS-equipped boats or ships that may be within a specified radius.

The term "grease" as used herein is defined as any viscous substance, preferably any thick oil or animal fat that is sufficiently insulative to prevent an electrical signal of a typical power and wattage sufficient for household usage from passing through the substance; and further is also preferably capable of being applied to a solid elongated member such as a pin that may be an element of one of the male plugs described herein, and later removed by wiping it off, such that when applied to the solid member, the oil or fat may cover the surface of the solid member, preventing water or other liquid from contacting the solid member, and also preventing the flow of electrical current through the oil or fat, but which can later be removed, thus providing for the flow or electrical current. An example of grease is a dielectric silicone grease that is capable of water repellence while hydrolytically stable with low toxicity.

3. Certain Specific Embodiments

Now, certain specific embodiments are described, which are by no means an exclusive description of the inventions. Other specific embodiments, including those referenced in the drawings, are encompassed by this application and any patent that issues therefrom.

One or more specific embodiments disclosed herein includes a personal flotation device, comprising a vest capable of floating in water and having front panels capable of being alternately either in an open position or a closed position; a power source; a light source electrically connected to the power source; at least two support straps that are capable of holding the vest in a closed position; a first electrical cable that has a first front end, a first rear end, and one or more electrically conductive metal wires passing through the first electrical cable from the first front end to the first rear end, wherein each of the one or more electrically conductive wires passing through the first electrical cable includes a first wire end portion; and a second electrical cable that has a second front end, a second rear end, and one or more electrically conductive metal wires passing through the second electrical cable from the second front end to the second rear end, wherein each of the one or more electrically conductive wires passing through the second electrical cable includes a second wire end portion. Further, the first front end and the second front end are capable of being connected to one another to form a connector assembly through which electrical current is capable of flowing from the first wire end portion to the second wire end portion, and the connector assembly includes a housing for preventing water from contacting either the first wire end portion or the second wire end portion when the connector assembly is formed.

In any one of the methods or systems disclosed herein, the power source may be affixed to the vest.

In any one of the methods or systems disclosed herein, the light source may be capable of emitting light when electrical current passes from the power source to the light source.

In any one of the methods or systems disclosed herein, the vest may comprise an outer vest surface and an inner vest surface with a vest cavity disposed between the outer and inner vest surfaces, and the power source positioned inside the vest cavity.

In any one of the methods or systems disclosed herein, the vest may be inflatable.

In any one of the methods or systems disclosed herein, the vest may comprise a buoyancy core material.

In any one of the methods or systems disclosed herein, the vest may comprise a back panel and two front panels.

In any one of the methods or systems disclosed herein, the first wire end portion may comprise a female receptacle end.

In any one of the methods or systems disclosed herein, the second wire end portion may comprise a male plug end.

In any one of the methods or systems disclosed herein, the male plug end may comprise at least one pin that is partially encased in rubber molding.

In any one of the methods or systems disclosed herein, the male plug end may comprise at least one pin that has grease applied to the at least one pin.

In any one of the methods or systems disclosed herein, the power source may comprise at least one photovoltaic cell.

In any one of the methods or systems disclosed herein, the personal flotation device may include at least one rechargeable battery.

In any one of the methods or systems disclosed herein, the personal flotation device may include a charge controller.

In any one of the methods or systems disclosed herein, the personal flotation device may include an inverter.

In any one of the methods or systems disclosed herein, the power source may be at least one battery.

In any one of the methods or systems disclosed herein, the personal flotation device may include an emergency beacon.

One or more specific embodiments disclosed herein includes a personal flotation device, comprising a vest capable of floating in water; a battery coupled to the vest; a light source coupled to the vest; a first flexible conduit coupled to the vest and a first wire disposed inside the first conduit; a second flexible conduit coupled to the vest and a second wire disposed inside the second conduit, wherein the first wire and the second wire are capable of forming an electrical connection such that electrical current is capable of passing between the first wire and the second wire; and a housing that prevents water from contacting either the first wire or the second wire while electrical current is passing between the first wire and the second wire.

In any one of the methods or systems disclosed herein, the personal flotation device may include a housing wherein the housing is an integral part of the first or the second flexible conduit.

In any one of the methods or systems disclosed herein, the personal flotation device may additionally comprise a first plug coupled to the first wire wherein electrical current is capable of flowing between the first plug and the first wire; and a second plug coupled to the second wire wherein electrical current is capable of flowing between the second plug and the second wire.

In any one of the methods or systems disclosed herein, the personal flotation device may additionally comprising a male plug end and a female receptacle end; wherein the male plug end and the female receptacle end are capable of forming an electrical connection through which electrical current is capable of flowing, and the female receptacle end includes the housing that prevents liquid from contacting either the first wire or the second wire while the electrical connection is formed.

In any one of the methods or systems disclosed herein, the personal flotation device may comprise the first wire or the second wire connected to the light source, such that electrical current is capable of flowing to the light source.

One or more specific embodiments disclosed herein includes a personal flotation device, comprising a vest capable of floating in water; a battery; a light source; a first conduit coupled to the vest and a first wire disposed inside the first conduit; a second conduit coupled to the vest and a second wire disposed inside the second conduit; a first plug coupled to the first wire wherein electrical current is capable of flowing between the first plug and the first wire; and a second plug coupled to the second wire wherein electrical current is capable of flowing between the second plug and the second wire wherein the first plug includes a male plug end. Further, the second plug includes a female receptacle end; the female receptacle end and the male plug end are capable of forming an electrical connection through which electrical current is capable of flowing; and the female receptacle end includes a housing that prevents liquid from contacting either the first wire or the second wire while the electrical connection is formed.

4. Specific Embodiments in the Figures

The drawings presented herein are for illustrative purposes only and are not intended to limit the scope of the claims. Rather, the drawings are intended to help enable one having ordinary skill in the art to make and use the claimed inventions.

Referring to FIGS. 1-9, a specific embodiment, e.g., version or example, of a personal flotation device is illustrated. These figures may show features which may be found in various specific embodiments, including the embodiments shown in this specification and those not shown.

In FIG. 1, a perspective view of a specific embodiment of a personal flotation device 12 is depicted. The personal flotation device 12 includes a vest 14 capable of floating in water and having front panels 16 capable of being alternatively either in an open position or a closed position. The personal flotation device 12 includes at least one photovoltaic cell 18, attached to the vest 14.

Figure 2A:
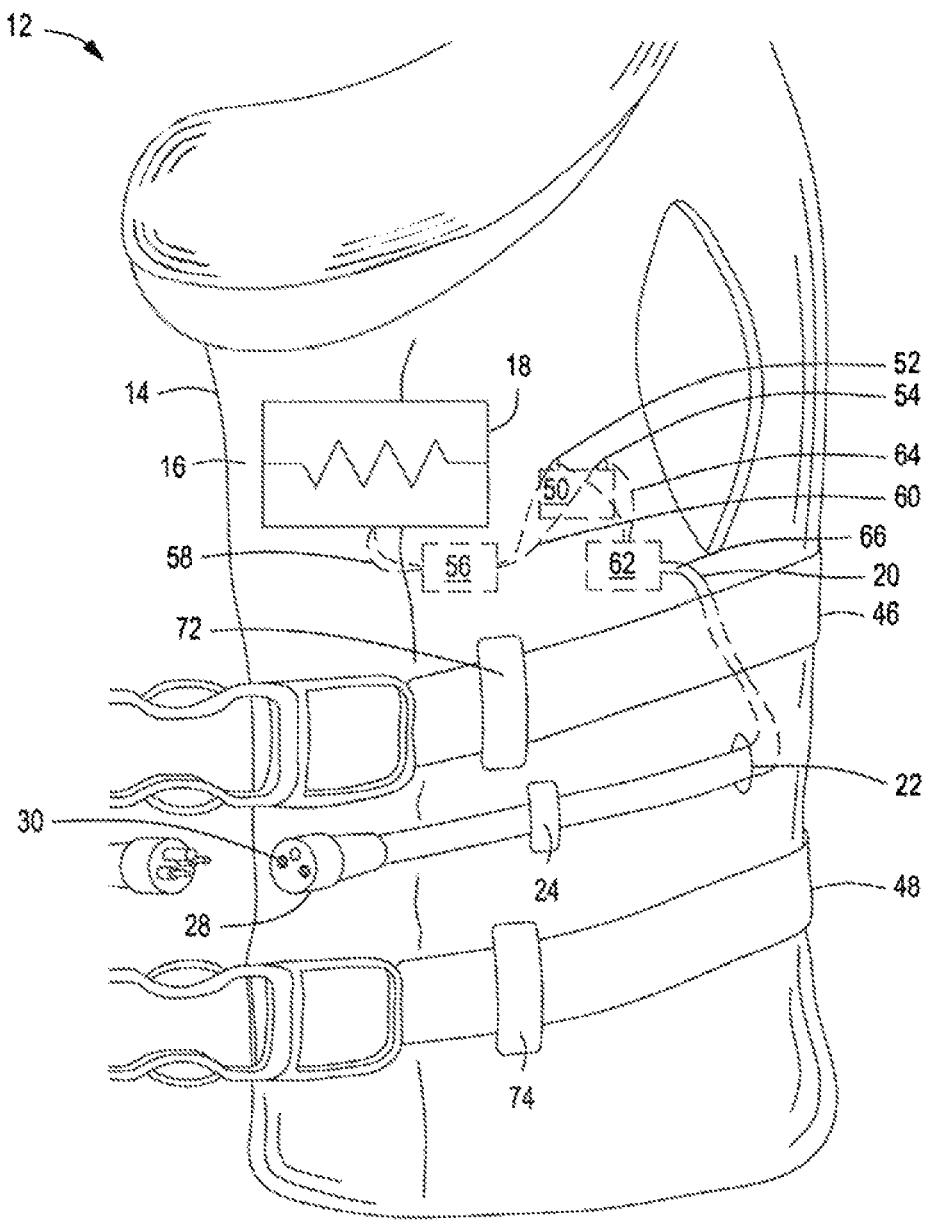
FIGS. 2A and 2B are sectional views of a personal flotation device from the front.
Figure 2B:
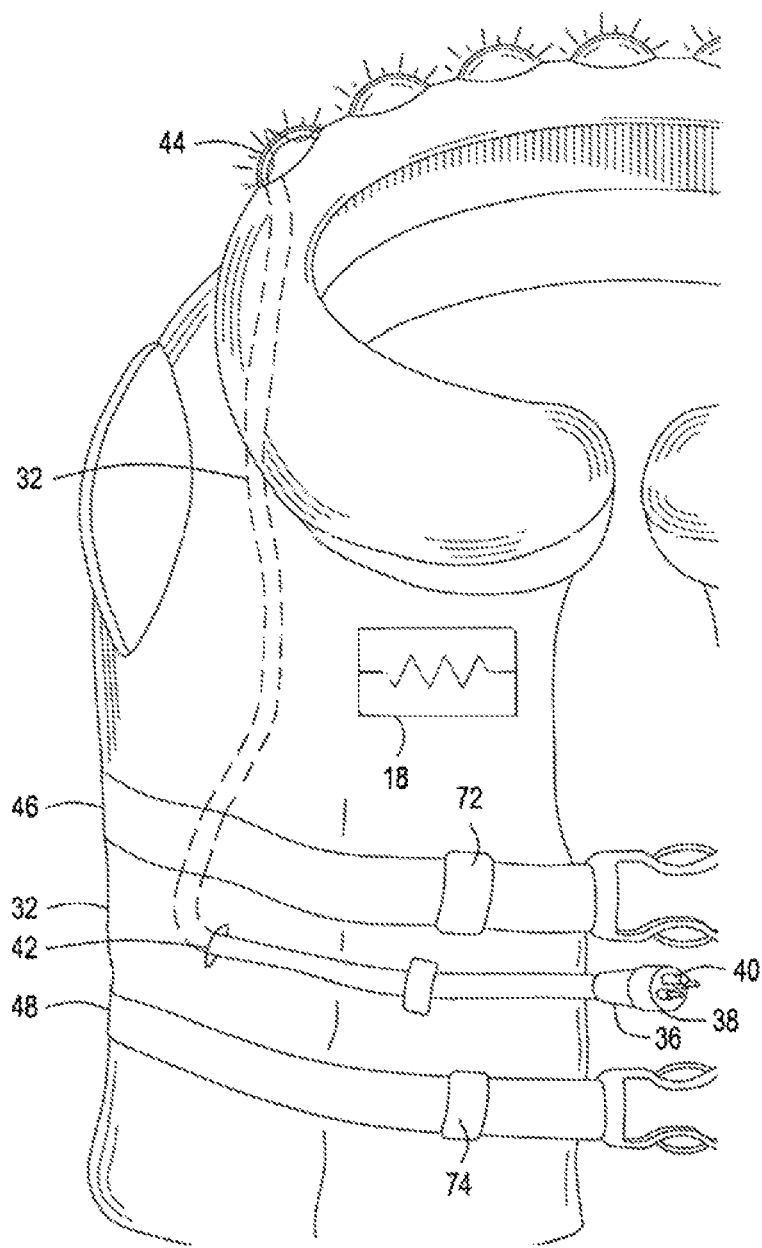

FIGS. 2A and 2B are sectional views of a specific embodiment of the personal flotation device 12. In FIG. 2A, the at least one photovoltaic cell 18 is attached to a charge controller 56 by a first set of wires 58. The charge controller 56 is connected to at least one rechargeable battery 50, which has a positive terminal 52 and a negative terminal 54, by a second set of wires 60, as seen in FIG. 2A. The positive terminal 52 and negative terminal 54 of the rechargeable battery 50 are also connected to an inverter 62 using inverter cables 64, as seen in FIG. 2A.

Figures 4, 5:
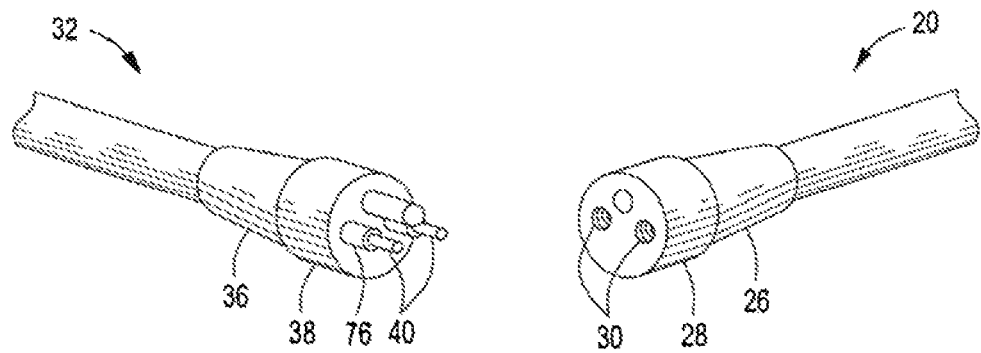
FIG. 4 is a perspective view of a male plug end.
FIG. 5 is a perspective view of a female receptacle end.

Returning to FIG. 1, the personal flotation device 12 also includes a first electrical cable 20, as seen in FIG. 1. The first electrical cable 20 has a first rear end 66 that is securely connected to the inverter 62, as seen in FIG. 2A. As seen in FIG. 1, the first electrical cable 20 exits the vest 14 through the first opening 22 in the vest 14, and the first electrical cable 20 is held in place on the vest 14 by a first securing loop 24 attached to the vest 14. The first electrical cable 20 also has a first front end 26 that includes a female receptacle end 28, wherein a plurality of recesses 30 are formed in the female receptacle end 28, as also seen in FIG. 5. Further, the personal flotation device 12 includes a second electrical cable 32, wherein the second electrical cable 32 is held in place on the vest 14 by a second securing loop 34, as seen in FIG. 1. The second electrical cable 32 has a second front end 36 that includes a male plug end 38, wherein the male plug end 38 has a plurality of pins 40, as also seen in FIG. 4. The second electrical cable 32 enters the vest 14 through the second opening 42 in the vest 14, as seen in FIG. 1. The personal flotation device 12 also includes a light source 44 with an input socket. The second electrical cable 32 has a second rear end 70 that is securely connected to the input socket of the light source 44, as seen in FIG. 2B. In FIG. 1, the plurality of pins 40 of the male plug end 38 may be inserted into the plurality of recesses 30 of the female receptacle end 28 in order to provide electricity to the light source 44. Further, the insertion of the plurality of pins 40 of the male plug end 38 into the plurality of recesses 30 of the female receptacle end 28 may be accomplished with the plurality of pins 40 substantially sealed off from contact with water. The personal flotation device 12 may also include a first support strap 46. The personal flotation device 12 may also include a second support strap 48.

Figure 3:
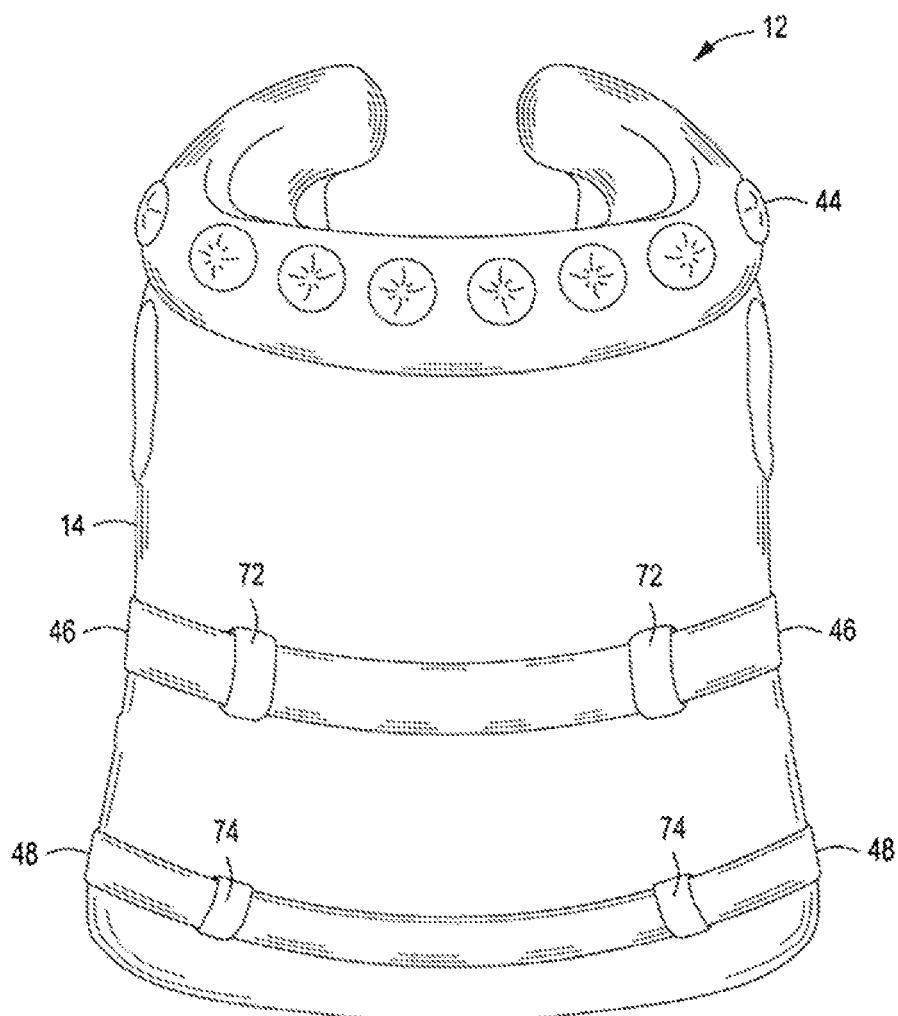
FIG. 3 is a perspective view of an embodiment of a personal flotation device from the back.

Referring now to FIG. 3, a back view of the personal flotation device 12 is depicted. The light source 44 is shown as a ring of lights around the collar of the vest 14. Further, the first support strap 46 of the personal flotation device 12 is shown with at least one set of first guiding loops 72. Also, the second support strap 48 of the personal flotation device 12 is shown with at least one set of second guiding loops 74.

Referring now to FIG. 4, a close up view of the male plug end 38 of the second electrical cable 32 is depicted. The male plug end 38 may include a plurality of pins 40. The plurality of pins 40 may be isolated from each other and partially surrounded by a rubber molding 76. Further, the plurality of pins 40 may be coated with a dielectric silicone grease. Referring now to FIG. 5, a close up view of the female receptacle end 28 of the first electrical cable 20 is depicted. The female receptacle end 28 may include the plurality of recesses 30. Further, the plurality of pins 40 of the male plug end 38 of FIG. 4 may be inserted into the plurality of recesses 30 of the female receptacle end 28 in order to provide electricity to the light source 44. The plurality of pins 40 may be inserted into the plurality of recesses 30 so that the connection is substantially sealed off from any fluids such as water.

Figure 6:
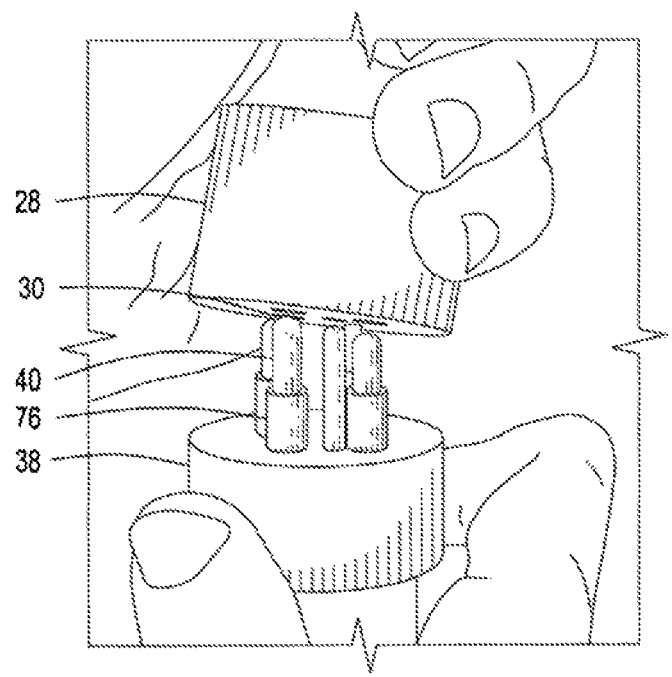
FIG. 6 is a perspective view of a connector assembly prior to coupling.
Figure 7:
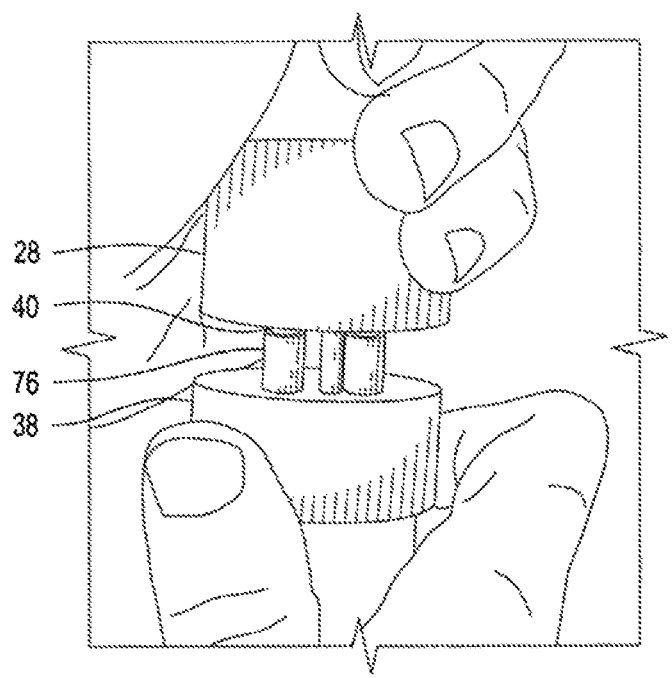
FIG. 7 is a perspective view of a connector assembly as coupling is initiated.

Referring now to FIG. 6, a perspective view of the male plug end 38 and the female receptacle end 28 is depicted. FIG. 6 shows the plurality of pins 40, each of which is partially surrounded by the rubber molding 76. FIG. 6 shows the plurality of pins 40 prior to being inserted into the plurality of recesses 30. Referring now to FIG. 7, a similar perspective view of the male plug end 38 and the female receptacle end 28 is depicted. FIG. 7 shows the plurality of pins 40 being inserted into the plurality of recesses 30 to the point where the rubber molding 76 of the plurality of pins 40 is beginning to enter the plurality of recesses 30.

Figure 8:
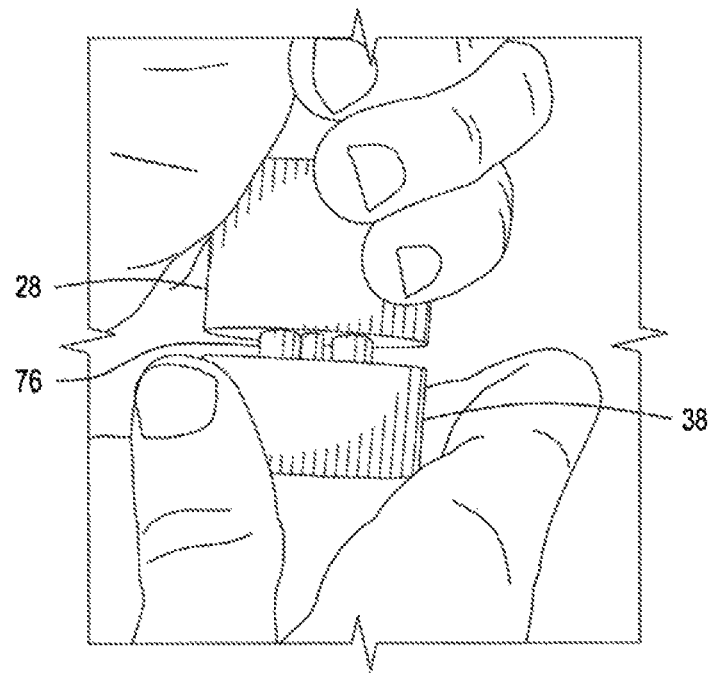
FIG. 8 is a perspective view of a connector assembly as coupling nears completion.
Figure 9:
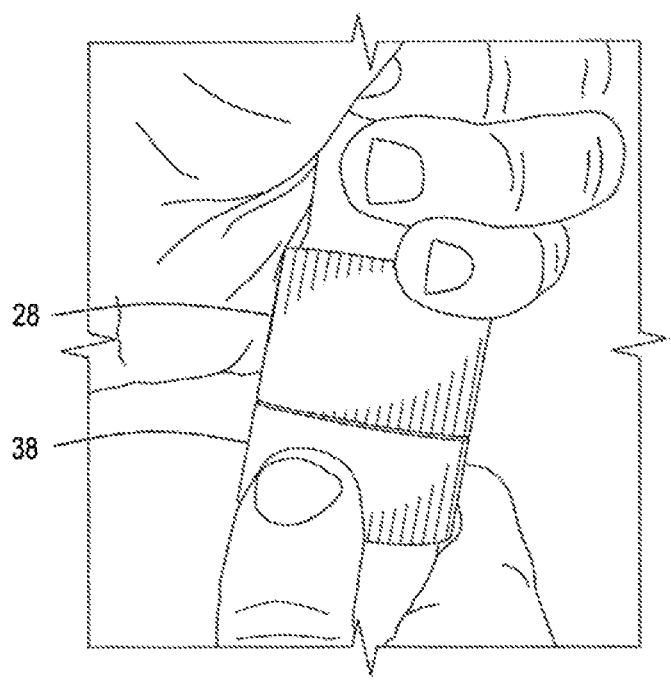
FIG. 9 is a perspective view of a coupled connector assembly.

Electrically, the connector assembly 78 of the claimed invention is designed for use undersea, and designed to be mated and disconnected undersea, while at the same time carrying an electrical charge. In an underwater situation, the insertion of the plurality of pins 40, coated in dielectric silicone grease, into the plurality of recesses 30 would begin to cause water to be displaced as the plurality of pins 40 enter the plurality of recesses 30. FIG. 8 depicts another perspective view of the male plug end 38 and the female receptacle end 28 as the plurality of pins 40 continue to displace water as the plurality of pins 40 are inserted into the plurality of recesses 30. FIG. 9 depicts a perspective view of the male plug end 38 and the female receptacle end 28 as the plurality of pins 40 are completely inserted into the plurality of recesses 30. The complete insertion of the plurality of pins 40 completes the electrical circuit between the at least one photovoltaic cell 18 and the light source 44. The dielectric silicone grease on the plurality of pins 40 along with the rubber molding 76 of the plurality of pins 40 and the isolation of each of the plurality of pins 40 from each other after insertion into the plurality of recesses 30 allows the male plug end 38 to be connected to the female receptacle end 28 underwater while carrying an electric charge. The male plug end 38 and the female receptacle end 28 may also be disconnected underwater while carrying an electric charge.

The personal flotation device 12 described above may be worn by an individual in emergency situations or recreationally. An individual may place his or her arms through the arm holes of the vest 14 of the personal flotation device 12 before or after entering the water. The vest 14 has the first support strap 46 and the second support strap 48, and the individual may close the two front panels 16 of the vest 14 by connecting the buckles of the first support strap 46 and the second support strap 48. Closing the front panels 16 of the vest 14 maintains the vest 14 in position to ensure flotation. An individual may also insert the male plug end 38 into the female receptacle end 28. This activates the light source 44 as well as any optional emergency beacons that may be included with the personal flotation device 12. It also assists in keeping the vest 14 closed.

The main benefit of any personal flotation device is that it can prevent drowning, especially in emergency situations at sea. Another problem with emergency situations at sea is the difficulty in rescue. Once an individual is lost at sea, it may be some time before authorities are notified that the individual is missing and possibly needs to be rescued. Thus, the individual may need to spend a great deal of time floating in his or her personal flotation device waiting for rescue. One of the benefits of the personal flotation device 12 is that it provides for at least one photovoltaic cell 18 to provide electricity to power the light source 44 and any emergency beacons through a rechargeable battery. This avoids the problem of batteries dying or weakening while the individual is waiting for rescue. Also, the ability of the individual to easily disconnect the connector assembly 78 helps to avoid unnecessary use of the light source 44 and any emergency beacons. The ability of the connector assembly 78 to be connected or disconnected while underwater and carrying a charge is a novel feature of the personal flotation device 12. Further, the light source 44 may assist rescue teams in locating an individual lost at sea, and the optional emergency beacons described above may further assist rescue teams with location and/or homing information of the individual lost at sea.

What is claimed as the invention is:

1. A personal flotation device, comprising:
    a vest capable of floating in water and having front panels capable of being alternately either in an open position or a closed position;
    a power source;
    a light source electrically connected to the power source;
    at least two support straps capable of holding the vest in a closed position;
    a first electrical cable that has a first front end disposed outside the vest, a first rear end disposed in the vest, and one or more electrically conductive metal wires passing through the first electrical cable from the first front end to the first rear end, wherein each of the one or more electrically conductive wires passing through the first electrical cable includes a first wire end portion; and
    a second electrical cable that has a second front end disposed outside the vest, a second rear end disposed in the vest, and one or more electrically conductive metal wires passing through the second electrical cable from the second front end to the second rear end, wherein each of the one or more electrically conductive wires passing through the second electrical cable includes a second wire end portion; wherein:
        the first front end and the second front end are capable of being connected to one another to form a connector assembly through which electrical current is capable of flowing from the first wire end portion to the second wire end portion; and
        the connector assembly includes a housing for preventing water from contacting either the first wire end portion or the second wire end portion when the connector assembly is formed.

2. The personal flotation device of claim 1, wherein the power source is affixed to the vest.

3. The personal flotation device of claim 1, wherein the vest has an outer vest surface and an inner vest surface with a vest cavity disposed between the outer vest surface and inner vest surface, and the power source positioned inside the vest cavity.

4. The personal flotation device of claim 1, wherein the vest is inflatable.

5. The personal flotation device of claim 1, wherein the vest includes a buoyancy core material.

6. The personal flotation device of claim 1, wherein the first wire end portion comprises a female receptacle end.

7. The personal flotation device of claim 1, wherein the second wire end portion comprises a male plug end.

8. The personal flotation device of claim 7, wherein the male plug end has at least one pin that is partially encased in rubber molding.

9. The personal flotation device of claim 7, wherein the male plug end has at least one pin that has grease applied to the at least one pin.

10. The personal flotation device of claim 1, wherein the power source comprises at least one photovoltaic cell.

11. The personal flotation device of claim 1, wherein the power source comprises at least one battery.

12. The personal flotation device of claim 11, wherein the personal flotation device also includes an inverter.

13. The personal flotation device of claim 12, wherein the personal flotation device also includes a charge controller.

14. The personal flotation device of claim 13, wherein the personal flotation device also includes at least one rechargeable battery.

15. The personal flotation device of claim 1, wherein the personal flotation device includes an emergency beacon.

16. A personal flotation device, comprising:
   a vest capable of floating in water;
   a battery coupled to the vest;
   a light source coupled to the vest;
   a first flexible conduit coupled to the vest, wherein the first flexible conduit has a first front end disposed outside the vest, a first rear end disposed in the vest, and a first wire disposed inside the first flexible conduit;
   a second flexible conduit coupled to the vest, wherein the second flexible conduit has a second front end disposed outside the vest, a second rear end disposed in the vest, and a second wire disposed inside the second flexible conduit, wherein the first wire and the second wire are capable of forming an electrical connection such that electrical current is capable of passing between the first wire and the second wire; and
   a housing that prevents water from contacting either the first wire or the second wire while electrical current is passing between the first wire and the second wire.

17. The personal flotation device of claim 16, additionally comprising a first plug coupled to the first wire wherein electrical current is capable of flowing between the first plug and the first wire; and a second plug coupled to the second wire wherein electrical current is capable of flowing between the second plug and the second wire.

18. The personal flotation device of claim 16 additionally comprising a male plug end and a female receptacle end; wherein the male plug end and the female receptacle end are capable of forming an electrical connection through which electrical current is capable of flowing, and the female receptacle end includes the housing that prevents liquid from contacting either the first wire or the second wire while the electrical connection is formed.

19. The personal flotation device of claim 16 wherein the first wire or the second wire are connected to the light source, such that electrical current is capable of flowing to the light source.

20. A personal flotation device, comprising:
   a vest capable of floating in water;
   a battery;
   a light source;
   a first conduit coupled to the vest, wherein the first conduit has a first front end disposed outside the vest, a first rear end disposed in the vest, and a first wire disposed inside the first conduit;
   a second conduit coupled to the vest, where the second conduit has a second front end disposed outside the vest, a second rear end disposed in the vest, and a second wire disposed inside the second conduit;
   a first plug coupled to the first wire wherein electrical current is capable of flowing between the first plug and the first wire; and
   a second plug coupled to the second wire wherein electrical current is capable of flowing between the second plug and the second wire, wherein:
   the first plug includes a male plug end;
   the second plug includes a female receptacle end;
   the female receptacle end and the male plug end are capable of forming an electrical connection through which electrical current is capable of flowing; and
   the female receptacle end includes a housing that prevents liquid from contacting either the first wire or the second wire while the electrical connection is formed.

* * * * *